United States Patent
Hahn et al.

[11] Patent Number: 5,991,891
[45] Date of Patent: Nov. 23, 1999

[54] METHOD AND APPARATUS FOR PROVIDING LOOP COHERENCY

[75] Inventors: Dennis J. Hahn; Jeremy D. Stover, both of Wichita, Kans.

[73] Assignee: LSI Logic Corporation, Milpitas, Calif.

[21] Appl. No.: 08/772,616

[22] Filed: Dec. 23, 1996

[51] Int. Cl.⁶ .................................................. G06F 11/00
[52] U.S. Cl. ............................................................ 714/4
[58] Field of Search ........................ 395/182.02, 182.03, 395/182.04, 185.02, 185.03; 371/40.2, 40.15; 370/222, 223, 228

[56] References Cited

U.S. PATENT DOCUMENTS

| | | | |
|---|---|---|---|
| 4,042,780 | 8/1977 | Wolters | 179/15 AL |
| 4,064,369 | 12/1977 | Battocletti | 179/15 |
| 4,454,508 | 6/1984 | Grow | 340/825.05 |
| 4,736,465 | 4/1988 | Bobey et al. | 455/612 |
| 4,837,856 | 6/1989 | Glista | 455/601 |
| 4,927,225 | 5/1990 | Levinson | 385/16 |
| 5,134,619 | 7/1992 | Henson et al. | 371/40.1 |
| 5,151,898 | 9/1992 | Kondo | 370/85.15 |
| 5,182,747 | 1/1993 | Frenzel, III et al. | 370/85.5 |
| 5,249,183 | 9/1993 | Wong et al. | 370/85.3 |
| 5,251,213 | 10/1993 | Videlock et al. | 370/85.12 |
| 5,289,589 | 2/1994 | Bingham et al. | 395/425 |
| 5,297,134 | 3/1994 | Takahashi et al. | 370/16.1 |
| 5,317,198 | 5/1994 | Husbands | 307/116 |
| 5,406,401 | 4/1995 | Kremer | 359/110 |
| 5,459,772 | 10/1995 | Asano et al. | 379/5 |
| 5,467,369 | 11/1995 | Vijeh et al. | 375/224 |
| 5,485,576 | 1/1996 | Fee et al. | 395/185.09 |
| 5,490,007 | 2/1996 | Bennett et al. | 359/139 |
| 5,517,489 | 5/1996 | Ogura | 370/16.1 |
| 5,517,498 | 5/1996 | Hauris et al. | 370/71 |
| 5,522,047 | 5/1996 | Grow et al. | 395/200.2 |
| 5,535,035 | 7/1996 | DeFoster et al. | 359/161 |
| 5,659,570 | 8/1997 | Cotreau et al. | 375/5 |
| 5,799,001 | 12/1995 | Lee et al. | 395/182.02 |

FOREIGN PATENT DOCUMENTS

| | | | |
|---|---|---|---|
| 0453273 | 10/1991 | European Pat. Off. | H04L 12/42 |
| 2617354 | 12/1988 | France | H04L 11/16 |

OTHER PUBLICATIONS

New Peripheral Interfaces: Fast & Full of Features; M. Wright; EDN Electrical Design News; vol. 40, No. 21, Oct. 12, 1995; pp. 69/70, 72, 74, 76, 78, 80, 81.

*Primary Examiner*—Robert W. Beausoliel, Jr.
*Assistant Examiner*—Pierre E. Elisea

[57] ABSTRACT

A method and apparatus for providing loop coherency between a multiplicity of nodes. The disclosed technique and apparatus utilize a primary loop for nominal data communications and a normally unutilized secondary loop. A loop coherency circuit detects a loop incoherency condition which results in a interruption of the primary loop. The loop coherency circuit reroutes the flow of data to a secondary loop segment and back to a primary loop segment to provide a continuous coherent arbitrated loop.

23 Claims, 5 Drawing Sheets

5,991,891

METHOD AND APPARATUS FOR PROVIDING LOOP COHERENCY

CROSS REFERENCE TO RELATED APPLICATIONS

The present invention is related to commonly assigned and co-pending U.S. application entitled "Port Bypass Circuit with Loopback Capability", invented by Charles Binford and Jeremy Stover, and having an internal docket number of 96-025 and Ser. No. 08/772,615, filed concurrently herewith on Dec. 23, 1996, and co-pending U.S. application entitled "Methods and Apparatus for Dynamic Topology Configuration in a Daisy-Chained Communication Environment" invented by Charles Binford, Rodney DeKoning and Jeremy Stover, having an internal docket number of 96-027 and Ser. No. 08/771,006, filed concurrently herewith on Dec. 23, 1996, and both of which are hereby incorporated by reference.

STATEMENT UNDER 37 CFR 1.71(D) AND (E)

A portion of the disclosure of this patent document contains material which is subject to copyright protection. The copyright owner has no objection to the facsimile reproduction by anyone of the patent document or the patent disclosure, as it appears in the patent and Trademark Office patent file or records, but otherwise reserves all copyright rights whatsoever.

FIELD OF INVENTION

The present invention relates generally to arbitrated loop environments and more specifically to maintaining loop coherency in Fibre Channel arbitrated loop environments.

BACKGROUND OF THE INVENTION

Fibre Channel is a 1 gigabit per second data transfer interface technology that maps several common transport protocols including IP and SCSI, allowing it to merge to high-speed I/O and networking functionality in a single connectivity technology. Fibre Channel is an open standard as defined by ANSI and OSI standards and operates over copper and fiber optic cabling at distances of up to 10 kilometers. ANSI ASC (Accredited Standards Committee) X3T11 is the primary committee responsible for Fibre Channel. It is unique in its support of multiple inter-operable topologies including point-to-point, arbitrated loop and switching and it offers several classes of service for network optimization. With its large packet sizes, Fibre Channel is ideal for storage, video, graphic and mass data transfer applications.

Fibre Channel Arbitrated loop was developed with peripheral connectivity in mind. It natively maps SCSI (as SCSI FCP), making it an ideal technology for high speed I/O connectivity. Native Fibre Channel Arbitrated Loop (FC-AL) disk drives allows storage applications to take full advantage of Fibre Channel's gigabit bandwidth, passing SCSI data directly onto the channel with access to multiple servers or nodes. FC-AL supports 127 node addressability and 10 km cabling ranges between nodes. Gigabit bandwidth and functionality also make Fibre Channel technology an attractive solution for server clustering.

Fibre Channel Arbitrated Loop (FC-AL) offers the highest overall performance and distance of any serial interface. Fibre Channel can transfer at 200 Mbytes/sec in full duplex mode over distances of 10 kilometers. Fibre Channel supports dual loop capability to provide a high resiliency environment. If a single loop is unavailable, the second loop continues operation. Fibre Channel hubs represent an additional level of control and resiliency. Hubs provide expansion flexibility where additional hosts and storage subsystems can be added with no disruption in the loop.

Arbitrated loop is implemented as a topology that takes the logic of switched topology and distributes it to all devices on the loop. This enables each device to use the loop as a point-to-point connection. Arbitrated loop works in a fashion where each device arbitrates for loop access, and once granted, has a dedicated connection between sender and receiver. The available bandwidth of the loop is shared between all devices. Since no switch is required to connect multiple devices, the cost per connection is significantly less.

When interconnecting Fibre-Channel Arbitrated Loop (FC-AL) enclosures together containing multiple FC devices, disruption of the loop may arise. For example, a cable may become detached from an enclosure or power may be inadvertently shut off or lost for a particular enclosure, an enclosure may need to be removed from the loop for servicing, etc. Under any of the above conditions, the loop is opened and the system becomes inoperable since each FC device in an FC-AL system acts as a repeater passing data around a loop unidirectionally. In Fibre Channel Arbitrated Loop environments, because each Fibre Channel node acts as a repeater for all other nodes that it is connected to, one failed node will bring the entire loop down.

Typically, an active hub or concentrator may be utilized into which each enclosure is connected. However, utilization of an active hub has several disadvantages. The central hub is a single point of failure which will bring down the entire loop if failure of the hub occurs. Additionally, the use of an active hub adds cost to the FC-AL system.

An enhancement to this method of providing loop coherency in Fibre Channel systems is achieved by creating PORT A and PORT B loops. The PORT A loop is utilized exclusively until a failure condition at which time the traffic is switched to the PORT B loop. These loops are created by cabling two fully independent, physical loops between enclosures. Redundant cabling and hardware provide full data path redundancy.

Although a hub or concentrator will automatically bypass a problem port and avoid most faults, it represents a single point of failure. Redundancies can be built into concentrators or fully redundant cabling and concentrators can be used to work around this. A concentrator configuration may detrimentally add to the cost of the loop system.

None of the known techniques to provide loop integrity in a Fibre Channel Arbitrated Loop environment provide a loop system having scaleable architecture and no central point of failure at a low cost. Thus, there lies a need to provide an economical and scaleable method and apparatus for maintaining loop coherency without a central point of loop failure in Fibre Channel Arbitrated Loop environments.

SUMMARY OF THE INVENTION

The present invention provides loop coherency in a Fibre Channel Arbitrated Loop environment without the need for utilizing a central hub. A loop coherency circuit having a pair of loop redundancy chips (LRC) or Port Bypass Circuits within each enclosure is utilized to provide loop coherency in the event of loop failure. The present invention is particularly advantageous in embedded system environments in which multiple Fibre Channel devices are stored locally in a single enclosure.

BRIEF DESCRIPTION OF THE DRAWINGS

The numerous objects and advantages of the present invention may be better understood by those skilled in the art by reference to the accompanying figures in which.

DETAILED DESCRIPTION

Figure 1:
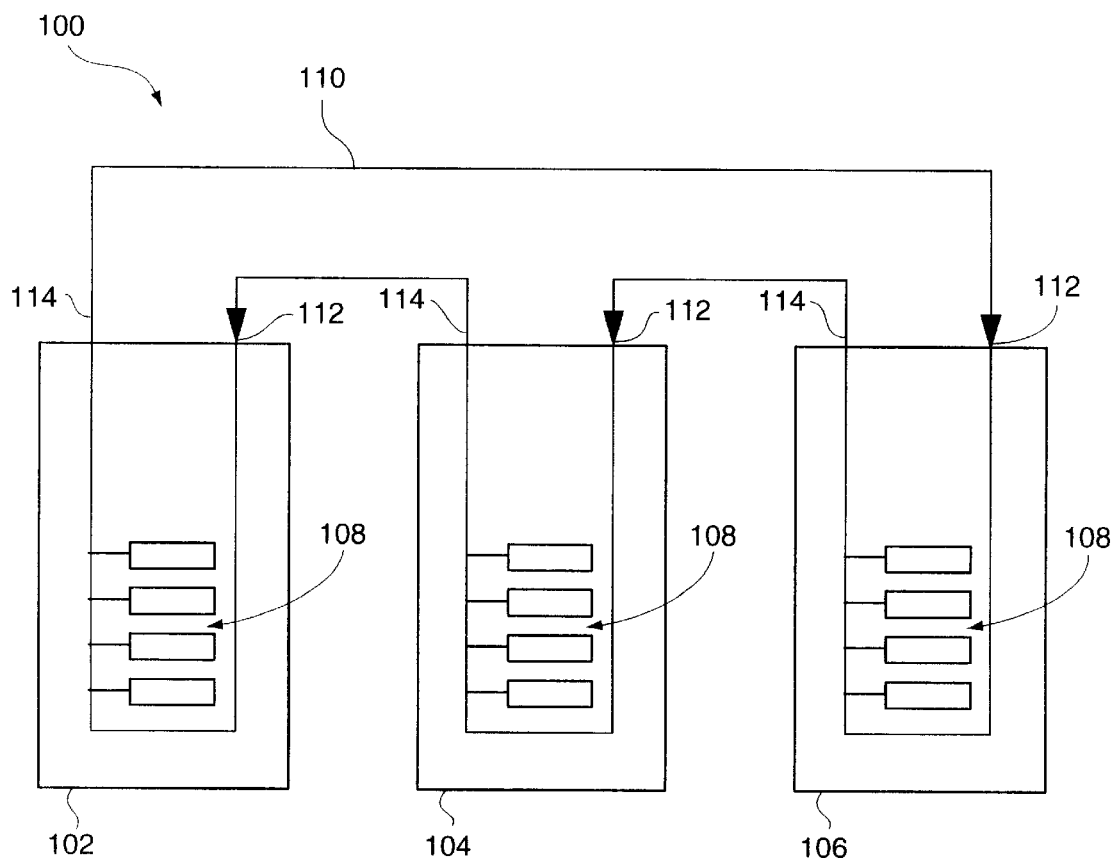
FIG. 1 depicts a hybrid Fibre Channel Arbitrated Loop system at steady state under normal operating system conditions.

Referring now to FIG. 1, a typical Fibre Channel Arbitrated Loop system is shown comprising three enclosures or loop ports each functioning as FC-AL nodes. The enclosures (102, 104 and 106) of the loop system 100 may contain a plurality of Fibre Channel devices 108, for example storage devices, disk drives, etc. which may be implemented in a RAID system (redundant array of inexpensive disks), for example. A primary Fibre Channel loop 110 provides a Fibre Channel Arbitrated Loop path for data transfer. The data flow on loop 110 enters each of enclosure at point 112 and egresses from each enclosure at point 114, passing through each of the Fibre Channel devices 108 contained within the enclosure. Since the loop 110 is a single closed path, any break or interruption of the loop 110 will bring down the entire system 100 in typical Fibre Channel Arbitrated Loop systems Referring now to FIG. 2, a typical Fibre Channel Arbitrated Loop (FC-AL) 100 is shown comprising three enclosures (102, 104 and 106) functioning as FC-AL nodes (also referred to as a loop port). Each enclosure may contain a plurality of Fibre Channel devices 108, for example storage devices, disk drives, etc. which may be implemented in a RAID system (redundant array of inexpensive disks), for example. A primary Fiber Channel loop 110 provides a Fibre Channel Arbitrated Loop path for data transfer. The data flow on primary loop 110 enters each of enclosure at point 112 and egresses from each enclosure at point 114, passing through each of the Fibre Channel devices 108 contained within the enclosure.

A second complete Fibre Channel loop 116 is further provided and is connected to each enclosure at points 118 and 120. The secondary loop 116 is a complete and independent path being wholly separate from the primary loop 110. Data is nominally transferred only on the primary loop 110 so long as the primary loop 110 provides a complete uninterrupted path and all enclosures on the loop are properly powered and functioning. The primary loop is held in steady state by the signal being passed between nodes and being watched by the loop coherency circuit. The secondary standby loop does not carry data but does have signal passed around it to keep it in steady state. A loop coherency circuit will look for signal levels present to hold it in steady state.

The secondary loop 116 is utilized only upon a condition of loop incoherency (e.g., a break in the primary loop or a node failure). Upon a condition of loop incoherency, data flow is transferred to the secondary loop 116 which in conjunction with the remaining coherent section of the primary loop 110, provides a complete path for the flow of data to all functioning devices. Thus, the secondary loop 116 may be referred to as a bypass loop. The primary loop 110 and the secondary loop 116 may be provided in a single Fibre Channel cable.

Control of the utilization of the secondary loop 116 upon a loop incoherency condition is maintained by a loop coherency circuit 122 provided within each enclosure (102, 104, 106). Each loop coherency circuit includes first and second multiplexers, or MUX, (124 and 126) operably connected to the primary loop 110 and the secondary loop 116, respectively. Each MUX functions to reroute the data flow from its nominal loop to the other respective bypass loop.

Figure 2:
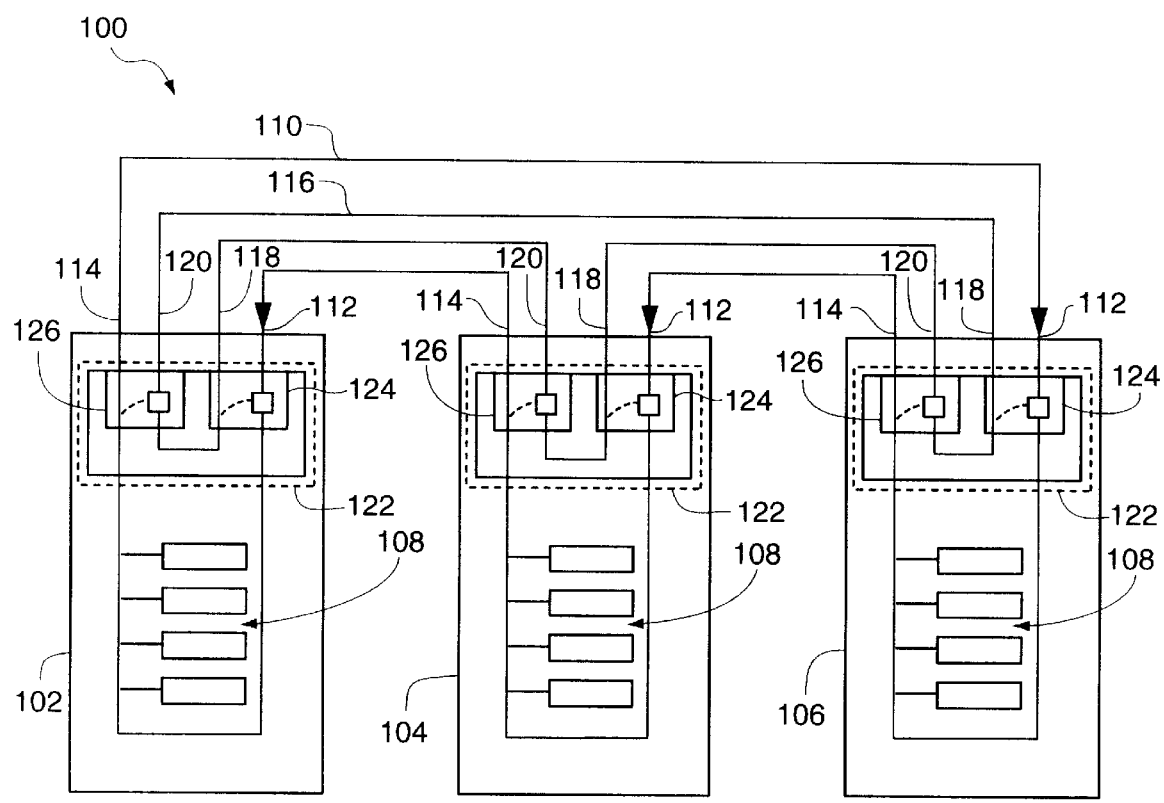
FIG. 2 depicts a Fibre Channel Arbitrated Loop of the present invention comprising three enclosures or loop ports each functioning as FC-AL nodes.
Figure 3:
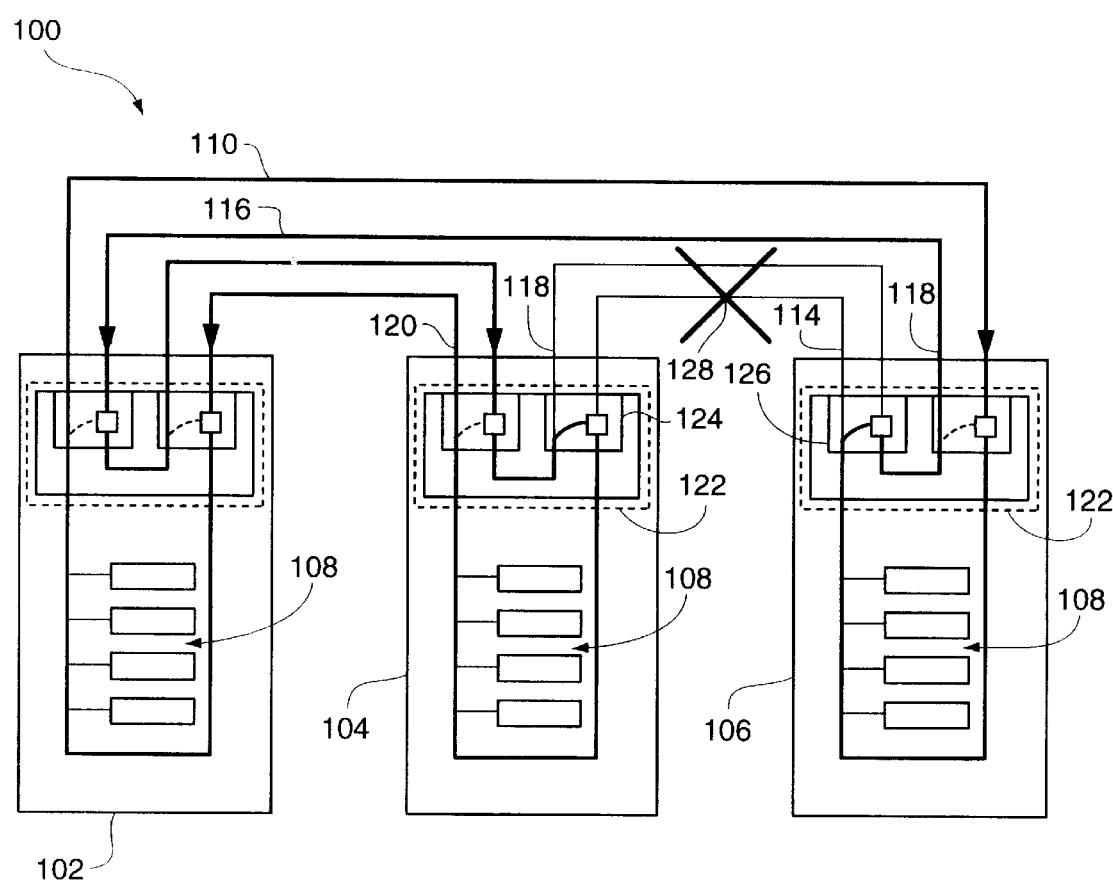
FIG. 3 depicts the Fibre Channel Arbitrated Loop of FIG. 2 further illustrating a loop incoherency condition due to cabling failure.

Referring now to FIG. 3, the Fibre Channel Arbitrated Loop of FIG. 2 is shown illustrating a loop incoherency condition. As depicted is FIG. 3, data normally flows on the primary loop 110 from node 102 to node 106 to node 104 and then back to node 102. A loop incoherency condition may arise upon a break in the arbitrated loop 100 caused by an inadvertent disconnecting of cabling between enclosures 104 and 106 as illustrated as loop discontinuity 128 which is a physical break in both the primary loop 110 and the secondary loop 116. The primary loop 110 thereupon becomes an open, incomplete path which would normally bring down a typical arbitrated loop. However, the loop coherency circuit 122 of enclosure 106 detects that downstream communications on the primary loop 110 to enclosure 104 have been lost and thereby activates multiplexer 126 associated with enclosure 104 to reroute data from point 114 on the primary loop 110 to point 118 on the bypass loop 116 for node 106. Data thereafter flows from enclosure 106 to enclosure 102 via the bypass loop 116. The direction of signal flow on the bypass loop 116 is in the opposite direction of signal flow on the primary loop 110.

Simultaneously, the loop coherency circuit 122 of node 104 detects the loss of upstream communications from enclosure 106 on the primary loop 110 upon the loop incoherency condition indicated at 128 and thereby activates multiplexer 124 associated with enclosure 104 to reroute data from point 118 on the bypass loop 116 to point 120 on the primary loop 110 through node 104. Thus, for a given break on the primary loop 110, data is effectively rerouted to the bypass loop 116 for the failed portion of the loop 110 and then rerouted back the to remaining intact portion of the primary loop 110 such that loop coherency is maintained.

The discontinuity 128 on the loop system 100 is thereby avoided and coherency of the loop system 100 is thereby maintained. Further, a flag or warning may be indicated upon a loop coherency condition such that the discontinuity 128 may be found and remedied (e.g., reconnecting or replacing the cabling).

Figure 4:
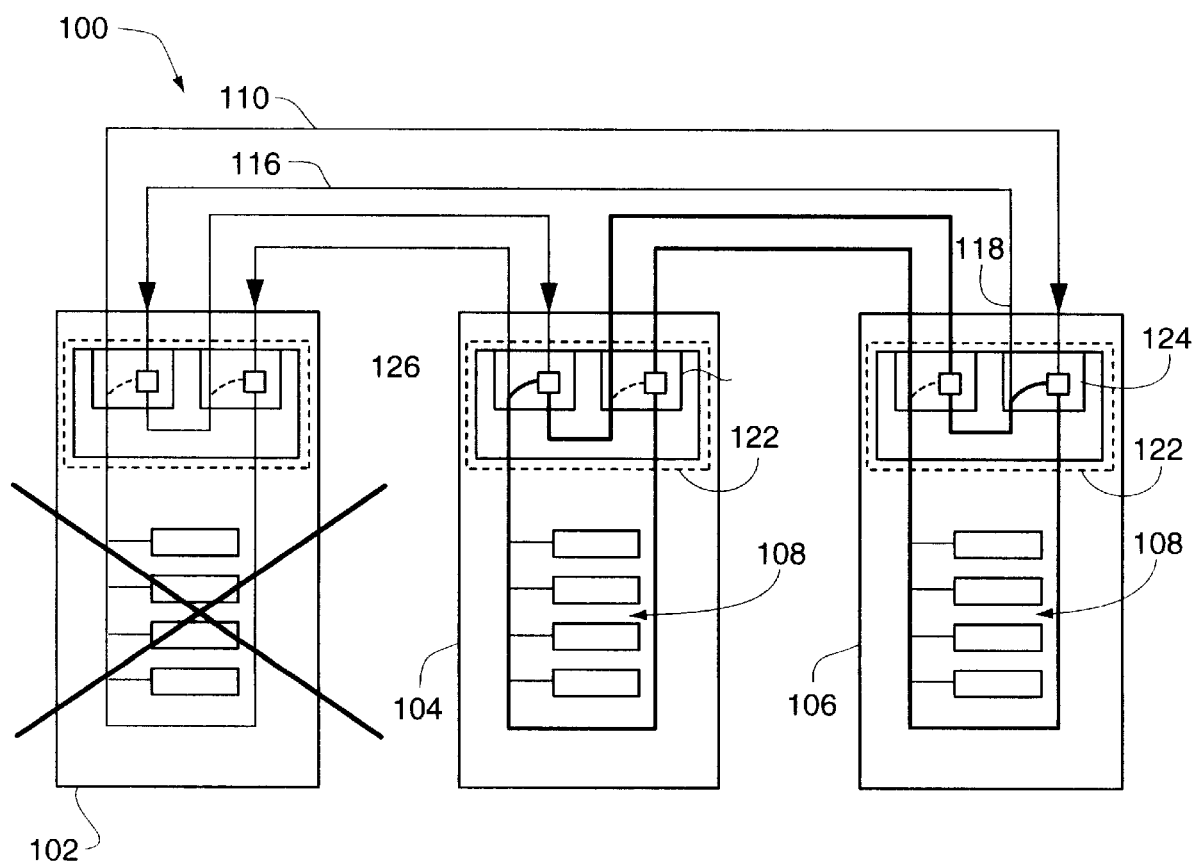
FIG. 4 depicts the Fibre Channel Arbitrated Loop of FIG. 2 further illustrating a loop incoherency condition due to node failure.

Referring now to FIG. 4, a Fibre-Channel Arbitrated Loop system is shown exhibiting a loop incoherency condition due to the failure of a node. A loop incoherency condition due to node failure may be caused by the removal of a node such as enclosure 102 from the arbitrated loop system 100. The removal of an enclosure from the loop system 100 may arise in several situations, for example power failure or shutdown, failure of the internal components contained within the enclosure, temporary shutdown for servicing, etc.

In order to provide coherency of the arbitrated loop system 100, the loop coherency circuit 122 of enclosure 104 detects the loss of downstream communications to enclosure 102 due to the removal of enclosure 102 from the loop, thereby indicating a loop incoherency condition. Upon detecting a loop incoherency condition, the loop coherency circuit 122 of enclosure 104 activates MUX 126 associated with communications to enclosure 102 to switch the flow of data from the primary loop 110 to the secondary loop 116. Similarly, the loop coherency circuit 122 of enclosure 106 activates MUX 124 when it detects a loop incoherency condition by the loss of upstream communications from the removal of enclosure 102 from the loop 110. Upon detecting a loop incoherency condition, the loop coherency circuit 122 of enclosure 106 activates MUX 124 triggered by a loss of communications from enclosure 102 to switch the flow of data from the secondary loop 116 back to the primary loop 110.

The inoperable node 102 is removed from the arbitrated loop system 100 and coherency of the loop system 100 is thereby maintained. Further, a return back to the redundant loop system 100 will occur automatically upon a loop coherency condition such that the failed node 102 being found and remedied (e.g., powered up or repaired).

Figure 5:
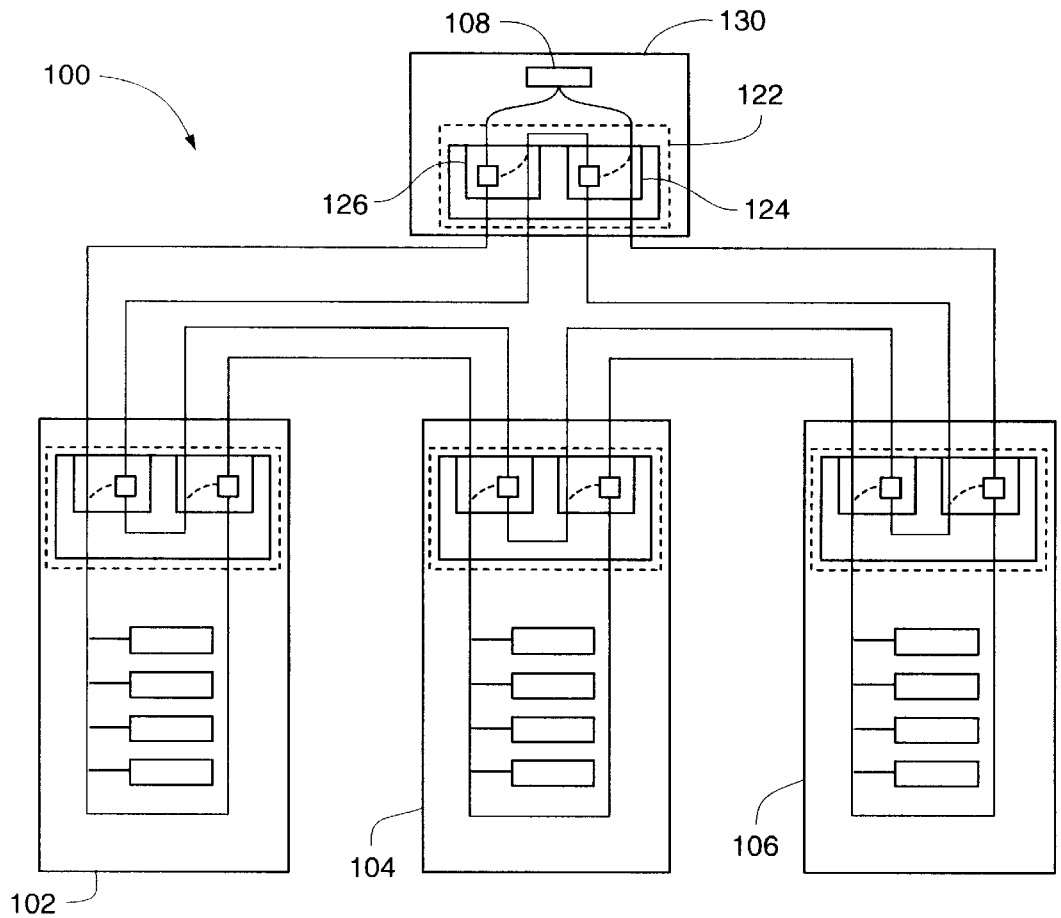
FIG. 5 depicts a Fibre Channel Arbitrated Loop system of the present invention illustrating a host based configuration.

Referring now to FIG. 5, a Fibre Channel Arbitrated Loop of the present invention is shown illustrating a host based configuration. A host configuration as shown in FIG. 5 may utilized a host enclosure 130 for allocating storage and I/O resources to each of the nodes on the arbitrated loop 110. The host 130 in the host based configuration of FIG. 5 becomes a node on the arbitrated loop 100. The host enclosure 130 includes a loop coherency circuit 122 such as the loop coherency circuits utilized in the other nodes (102, 104 and 106) of the arbitrated loop system 100. The loop coherency circuit 122 of the host enclosure 130 operates to maintain loop coherency in the event of a loop discontinuity or a node failure as described in the descriptions of FIGS. 3 and 4. Other FC-AL devices may be utilized with the arbitrated loop of the present invention in a manner similar to the utilization of the host enclosure 130. The cables between the devices utilize a single standard FC-AL twin-axis cable. The devices may utilize the loop coherency circuit 122 of the present invention to protect the integrity and coherency of the arbitrated loop system 100.

Figure 6:
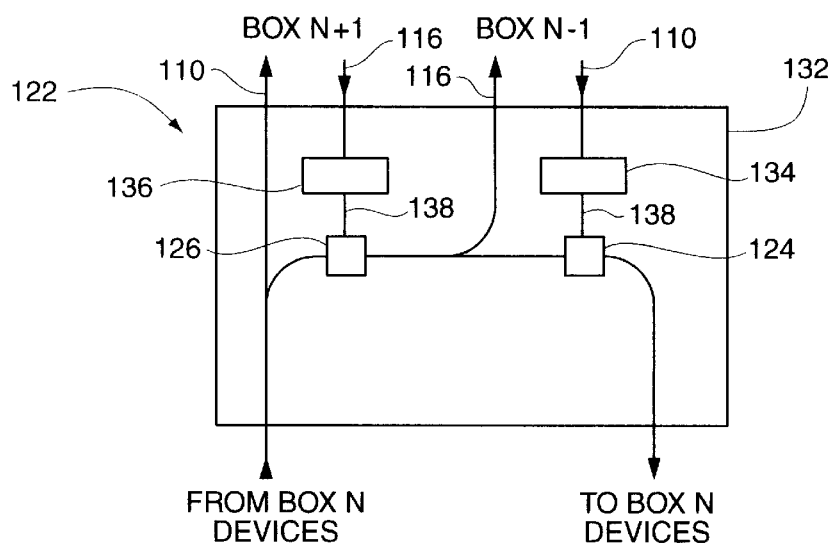
FIG. 6 depicts a loop coherency circuit fabricated on a single integrated circuit.

Referring now to FIG. 6, a loop coherency circuit is shown fabricated on a single integrated circuit. The coherency circuit 122 may be fabricated entirely on an integrated circuit 132 for implementation on a Fibre-Channel controller board, for example on a Series 3 Fibre-Channel RAID Controller available from Symbios Logic Inc. of Fort Collins, Colo. The loop coherency circuit 122 includes first and second multiplexers (124, 126) and first and second detector circuits (134, 136) respectively. Dectors and multiplexors are known in the art, such as those available in repeater hub circuit P/N VSC7120, available from Vitesse Semiconductor Corporation in Camarillo, Calif. The detector circuits (134, 136) are operably connected at 138 to the multiplexers (124, 126) and function to control the switching of the multiplexers (124, 126) upon detecting a loop incoherency condition. Connection 138 also provides a data path between the detector circuits (134, 136) and the multiplexors (124, 126). The integrated circuit 132 may be utilized in an enclosure functioning as node N in a Fibre Channel Arbitrated Loop. As shown, the integrated circuit connects between the Fibre Channel devices contained in the node N enclosure, ("TO BOX N DEVICES") and ("FROM BOX N DEVICES"), to the previous node ("BOX N−1") and to the succeeding node ("BOX N+1") on the arbitrated loop.

It is believed that the method and apparatus for providing loop coherency in Fibre Channel Arbitrated Loop environments of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

We claim:

1. A data communications network, comprising:

a plurality of nodes, each of said plurality of nodes containing at least one device;

a primary loop and a secondary loop each being connected to each of said plurality of nodes;

a loop coherency circuit associated with each of said plurality of nodes, each of said loop coherency circuits being operably connected to said primary loop and to said secondary loop, said loop coherency circuit for at least partially routing data between the primary loop and the secondary loop upon detecting loss of a steady state signal such that said primary loop and said secondary loop together form a complete loop, wherein said loop coherency circuit comprised first and second loop incoherency detectors being associated with first and second multiplexers, respectively, said first and second loop coherency detectors for detecting a loop incoherency condition and for controlling said first and second multiplexers, respectively to route data between said primary loop and said secondary loop.

2. A data communications network as claimed in claim 1, wherein said loop coherency circuit includes first and second link redundancy circuits each being connected to said primary loop and to said secondary loop, said first link redundancy circuit being connected to a previous node and said second link redundancy circuit being connected to a succeeding node.

3. A data communications network as claimed in claim 1, wherein said plurality of nodes contain at least one Fibre-Channel device.

4. A data communications network as claimed in claim 1, wherein said primary loop is an independent arbitrated loop.

5. A data communications system as claimed in claim 1, wherein said secondary loop is normally unused for data routing.

6. A data communications network as claimed in claim 1, wherein said primary loop and said secondary loop together form a complete arbitrated loop during a primary loop incoherency condition.

7. A data communications network system as claimed in claim 1, wherein said primary loop and said secondary physical loop together form a complete Fibre Channel Arbitrated loop during a primary loop incoherency condition.

8. A data communications network system as claimed in claim 1, wherein said primary loop and said secondary loop include Fibre-Channel arbitrated loop twin-axis cables.

9. A data communications network, comprising:

a plurality of nodes, each of said plurality of nodes containing at least one device;

a primary loop and a secondary loop each being connected to each of said plurality of nodes;

a host for allocating storage and I/O resources to each of said plurality of nodes, said host containing at least one device, said primary loop and said secondary loop connecting said host to said plurality of nodes; and a loop coherency circuit associated with each of said plurality of nodes and with said host, each of said loop coherency circuits being operably connected to said primary loop and to said secondary loop, wherein said loop coherency circuit at least partially routes data between the primary loop and the secondary physical loop upon detection of a loop incoherency condition such that said primary loop and said secondary loop together form a complete loop, wherein said loop coherency circuit comprises first and second loop incoherency detectors being associated with first and second multiplexers, respectively, said first and second loop coherency detectors for detecting a loop incoherency condition and for controlling said first and second multiplexers, respectively to route data between said primary loop and said secondary loop.

10. A data communications network as claimed in claim 9, wherein said loop coherency circuit includes first and second link redundancy circuits each being connected to said primary loop and to said secondary loop, said first link redundancy circuit being connected to a previous node and said second link redundancy circuit being connected to a succeeding node.

11. A data communications network as claimed in claim 9, wherein said loop coherency circuit associated with said host includes first and second link redundancy circuits each being connected to said primary loop and to said secondary loop, said first link redundancy circuit being connected from said host to a previous node and said second link redundancy circuit being connected from said host to a succeeding node.

12. A data communications network as claimed in claim 9, wherein said device of said plurality of nodes is a Fibre-Channel device.

13. A data communications network as claimed in claim 9, wherein said device of said host is a Fibre-Channel device.

14. A data communications network as claimed in claim 9, wherein said primary loop is an independent arbitrated loop and said secondary physical loop.

15. A data communications system as claimed in claim 9, wherein said secondary loop is normally unused for data routing.

16. A data communications network as claimed in claim 9, wherein said primary loop and said secondary physical loop together form a complete arbitrated loop during a primary loop incoherency condition.

17. A data communications network system as claimed in claim 9, wherein said primary loop and said secondary loop together form a complete Fibre Channel Arbitrated loop during a primary loop incoherency condition.

18. A data communications network as claimed in claim 9, wherein said primary loop and said secondary loop include Fibre-Channel arbitrated loop twin-axis cables.

19. A loop coherency circuit for providing loop coherency on a loop data communications system, comprising:

first and second multiplexers; and first and second detector circuits, operably connected to said first and second multiplexers, respectively, for controlling the switching of said first and second multiplexers in response to loss of a steady state signal in the loop data communications system.

20. A loop coherency circuit as claimed in claim 19, further comprising an integrated circuit substrate upon which said first and second multiplexers and said first and second detector circuits are fabricated.

21. A loop coherency circuit for providing loop coherency on a loop data communications system, comprising:

first and second multiplexers; and first and second detector circuits, operably connected to said first and second multiplexers, respectively, for controlling the switching of said first and second multiplexers in response to loss of a steady state signal in the loop data communications system, wherein said first detector circuit and first multiplexor are connected by a single path having both data and control information.

22. The loop coherency circuit of claim 21, wherein the control information is presence of a steady state signal that biases the multiplexer to a first state.

23. The loop coherency circuit of claim 21, wherein the control information is loss of a steady state signal that biases the multiplexer to a second state.

* * * * *